United States Patent

Hori

[11] Patent Number: 5,774,143
[45] Date of Patent: Jun. 30, 1998

[54] DOT-MATRIX TYPE PRINTING SYSTEM

[75] Inventor: Masaaki Hori, Tajimi, Japan

[73] Assignee: Brother Kogyo Kabushiki Kaisha, Nagoya, Japan

[21] Appl. No.: 657,904

[22] Filed: Jun. 7, 1996

[30] Foreign Application Priority Data

Jun. 7, 1995 [JP] Japan ..................................... 7-140318

[51] Int. Cl.$^6$ ..................................................... B41J 2/145
[52] U.S. Cl. .............................................................. 347/40
[58] Field of Search .................................. 347/20, 40, 41, 347/42, 107

[56] References Cited

U.S. PATENT DOCUMENTS

| 4,023,180 | 5/1977 | Zenner | 347/54 |
| 4,415,909 | 11/1983 | Italiano et al. | 347/68 |
| 4,675,692 | 6/1987 | Goshima et al. | 347/180 |
| 4,709,247 | 11/1987 | Piatt et al. | 347/40 |
| 4,809,021 | 2/1989 | Check et al. | 347/251 |
| 5,079,571 | 1/1992 | Eriksen | 347/43 |
| 5,124,720 | 6/1992 | Schantz | 347/19 |
| 5,359,355 | 10/1994 | Nagoshi et al. | 347/9 |
| 5,520,469 | 5/1996 | Owa | 400/76 |
| 5,598,191 | 1/1997 | Kneezel | 347/40 |
| 5,640,183 | 6/1997 | Hackleman | 347/40 |

FOREIGN PATENT DOCUMENTS

A-57-110483 7/1982 Japan .

*Primary Examiner*—Adolf Berhane
*Attorney, Agent, or Firm*—Oliff & Berridge, PLC

[57] ABSTRACT

The printing elements 200 are arranged with the basic pitch P of 1/180 inch. The sheet feeding mechanism 24 can feed the sheet of paper 23 at the sheet feed pitch F of 1/160 inch. The sheet feeding mechanism 24 is controlled to feed the sheet of paper 23 by a distance of R/160 inches, and a desired data is allotted to a S-th printing element 200. When the values R and S satisfy the following equation (1), the S-th printing element can print a dot at a position n/1440 inches away from an initial position at which the first printing element is initially located.

$$n/1440 = (S - 1)/180 + R/160 \qquad (1)$$
$$= 8(S - 1)/1440 + 9R/1440$$

Thus, the printing system can print dots at a dot density of 1/1440 inch which is the highest common divisor of the values 1/160 inch and 1/180 inch.

17 Claims, 9 Drawing Sheets

DOT-MATRIX TYPE PRINTING SYSTEM

BACKGROUND OF THE INVENTION

1. Field of the Invention

The present invention relates to a dot-matrix type printing system for printing dot images on a printing medium.

2. Description of the Related Art

In a printing apparatus of the dot-matrix type printing system, a print head is provided with a plurality of, for example, 24 printing elements. The 24 printing elements are aligned substantially along a vertical direction Y at a basic pitch or interval of 1/180 inch, for example. The print head is conveyed relative to a recording medium in a horizontal direction X (referred to as a line printing direction hereinafter.) The print head is controlled to print dots every time the print head is conveyed in the line printing direction X by the basic pitch (1/180 inch.) When the print head is conveyed entirely over the width of the recording medium (paper), one line image is produced. This line image has a 24-dot height. After the one line of dot image is thus produced, the paper is fed upwardly relative to the print head along the vertical direction Y. (The vertical direction Y will be referred to as a sheet feed direction Y hereinafter.) The print head is again controlled while being conveyed in the line printing direction X, so that another line image is produced next to and below the already-produced line image.

Thus, the print head has to be conveyed in the line direction X at the basic pitch (1/180 inch.) The paper has to be fed at the same pitch.

When one line image contains only characters of 24-dot height or less, the line can be printed while the print head is moved only once in the line printing direction X. However, there are the cases that the line image contains characters with heights of greater than 24 dots. For example, the line image may include an enlarged character or a mathematical expression, such as an integral mark "∫," which has the height longer than 24 dots.

FIG. 1 shows one example where one line image contains both a normal-sized kanji character of a 24-dot height and an integral mark "∫" of a 40-dot height. In the drawing, the normal-sized kanji character is indicated by (2), and the over-sized integral mark is indicated by (1). Black dots indicate positions where dots are printed, and white dots indicate positions where no dots are printed.

As shown in FIG. 1, data of this entire line image is generally divided into three sections A, B, and C along the sheet feed direction Y. Section B has a 24-dot height. Section A is located above the section B and has an 8-dot height. Section C is located below the section C and also has an 8-dot height. Data of these sections A, B, and C is separately developed into three pattern buffer areas. The print head is controlled by the data of each section during the print head is conveyed once in the line printing direction X.

The 24 printing elements provided to the print head are numbered 1 through 24. The uppermost element is numbered 1, and the lowermost element is numbered 24. The numbers listed on the righthand side in the drawing indicate the printing elements with which the corresponding dots are printed.

It is now assumed that the print head is initially located at an initial position Y0 relative to the sheet as shown in FIG. 1. That is, the uppermost printing element is initially located on the position Y0 on the sheet. This initial position Y0 is away from a region B where the section B is to be printed.

The distance between the initial position Y0 and the region B is n/180 inches (n=61, for example). In this case, in order to print out the line image of FIG. 1, the following series of steps are performed.

1) The sheet is first fed by the distance of n/180 (61/180) inches upwardly, i.e., in a forward feed direction so that the print head confronts the region B.

2) Then, the sheet is fed by the distance of 8/180 inches downwardly, i.e., in a rearward direction so that the printing elements numbered 1 through 8 confront a region A where the section A is to be printed.

3) Data of the section A is printed with the printing elements numbered 1 through 8 while the print head is conveyed in the line printing direction X.

4) The sheet is then fed by 8/180 inches in the forward direction so that the print head returns to the region B.

5) Data of the section B is printed with all the printing elements numbered 1 through 24 while the print head is conveyed in the line printing direction X.

6) The sheet is then fed by 24/180 inches in the forward direction so that the printing elements numbered 1 through 8 confront a region C where the section C is to be printed.

7) Data of the section C is printed with the printing elements 1 through 8 while the print head is conveyed in the line printing direction X.

The line image of FIG. 1 is thus produced while the print head is moved in the line printing direction X three times. However, this line image can also be produced while the print head is conveyed only two times as described below.

In this case, the line image is divided into two sections D and E as also indicated in the righthand side of FIG. 1. Data of these two sections D and E is separately stored into two pattern buffer areas. A printing operation is performed in the following manner:

1) The sheet is first fed by (n–8)/180 (=53/180) inches in the forward direction so that the print head confronts a portion D desired to be printed with the section D.

2) Data of the section D is printed while the print head is conveyed in the line printing direction X.

3) The sheet is then fed by 24/180 inches in the forward direction so that the printing elements numbered 1 through 16 confront a region E which is desired to be printed with the section E.

4) Data of the section E is printed with the printing elements numbered 1 through 16 while the print head is conveyed in the line printing direction X.

SUMMARY OF THE INVENTION

In both of the above-described printing operations, data stored in the uppermost position in each buffer area is printed by the first printing element (i.e., the uppermost printing element.) Therefore, each of the sheet feeding operations has to be conducted so that the uppermost printing element will properly confront the uppermost position in the corresponding region A–E. Accordingly, the sheet has to be fed at a sheet feed pitch equal to the basic pitch (1/180 inch.)

According to the above-described operations, dot density of the produced image becomes equal to the basic pitch. This dot density can, however, be increased twice the basic pitch in the following manner.

The print head is first actuated to print dot lines while the print head is conveyed in the line printing direction X. Then, the sheet is fed in the sheet feeding direction Y by a distance a half of the basic pitch, i.e., 1/360 inch. Then, the print head is again actuated to print dot lines. As a result, dot lines are printed between already-printed two successive dot lines. Accordingly, dot density becomes twice the basic pitch.

Recently, the printing system is required to print more clearly and more minute images. In order to feed a sheet by a smaller pitch, however, it becomes necessary to employ a motor of a higher resolution. Or, it becomes necessary to increase a reduction rate with which a gear mechanism transmits power from the motor toward a sheet feeding mechanism. The printing system therefore becomes expensive.

When a motor of a high resolution is employed, it takes a long time for feeding the sheet. Accordingly, the printing performance of the printer becomes entirely lowered. In order to increase the printing performance, it becomes necessary to supply a larger power to the motor.

It is therefore, an object of the present invention to overcome the above-described drawbacks, and to provide an improved printing system which can print dots at a dot pitch equal to or lower than the basic pitch even when the sheet is fed by a pitch different from the basic pitch.

In order to solve the above and other objects, the present invention provides a dot matrix printing system for printing dots, the system comprising: a print head having a plurality of printing elements arranged at a predetermined pitch in a direction substantially perpendicular to a line printing direction; conveying means for conveying one of the print head and a printing medium in the line printing direction relative to the other one of the print head and the printing medium; feed means capable of feeding, at a feed pitch different from the predetermined pitch, one of the print head and the printing medium relative to the other one of the print head and the printing medium in a feed direction which is perpendicular to the line printing direction; pattern generating means for generating a printing pattern data desired to be printed by the printing elements; correspondence change means for changing a correspondence between arrangements of the printing pattern data in the feed direction and of the printing elements; and control means for controlling a feed amount desired to be attained by the feed means and for supplying the correspondence change means with information on a desired correspondence between the arrangements of the printing elements and of the printing pattern data in the feed direction, the feed amount and the information being determined based on a position desired to be printed with the printing pattern data.

According to another aspect, the present invention provides a dot matrix printing system for printing dots, the system comprising: a print head having a plurality of printing elements arranged with a predetermined pitch in a direction substantially perpendicular to a line printing direction; conveying means for conveying, in the line printing direction, one of the print head and a printing medium relative to the other one of the print head and the printing medium; feed means capable of feeding, at a feed pitch different from the predetermined pitch, one of the print head and the printing medium relative to the other one of the print head and the printing medium in a feed direction which is perpendicular to the line printing direction; storage means capable of storing a printing pattern data desired to be printed by the printing elements; write means capable of writing the printing pattern data into the storage means while changing a position of the printing pattern data in the feed direction; pattern reading means for successively reading the printing pattern data from the storage means in accordance with the conveyance of the one of the print head and the printing medium in the line printing direction; and control means for, based on a position desired to be printed with the printing pattern data, controlling a feed amount desired to be attained by the feed means and controlling the write means to change a position to which the write means writes the printing pattern data.

According to still another aspect, the present invention provides a printing system for printing dots, the system comprising: a printing apparatus for printing dots; and a data generating apparatus for generating printing pattern data desired to be printed by the printing apparatus. The printing apparatus may include: a print head having a plurality of printing elements arranged at a predetermined pitch in a direction substantially perpendicular to a line printing direction; conveying means for conveying, in the line printing direction, one of the print head and a printing medium relative to the other one of the print head and the printing medium; and feed means capable of feeding, at a feed pitch different from the predetermined pitch, one of the print head and the printing medium relative to the other one of the print head and the printing medium in a feed direction which is perpendicular to the line printing direction. The data generating apparatus may include: pattern generating means for generating a printing pattern data desired to be printed by the printing elements; correspondence change means for changing a correspondence between arrangements of the printing pattern data in the feed direction and of the printing elements; and control means for, based on a position desired to be printed with a dot, controlling a feed amount desired to be attained by the feed means and controlling the correspondence change means to change the correspondence into a desired correspondence between the arrangement of the printing pattern data in the feed direction and of the printing elements.

According to a further aspect, the present invention provides a printing system for printing dots, the system comprising: a printing apparatus for printing dots, and a data generating apparatus for generating a printing pattern data desired to be printed by the printing elements. The printing apparatus may include: a print head having a plurality of printing elements arranged with a predetermined pitch in a direction substantially perpendicular to a line printing direction; conveying means for conveying, in the line printing direction, one of the print head and a printing medium relative to the other one of the print head and the printing medium; and feed means capable of feeding, at a feed pitch different from the predetermined pitch, one of the print head and the printing medium relative to the other one of the print head and the printing medium in a feed direction which is perpendicular to the line printing direction. The data generating apparatus may include: storage means for storing the desired printing pattern data; and a printer driver for outputting the printing pattern data to the printing apparatus. The printer driver may include: pattern reading means for successively reading the printing pattern data from the storage means in accordance with the conveyance of the one of the print head and the printing medium; correspondence change means for changing correspondence between the arrangement of the read out printing pattern data in the feed direction and the arrangement of the printing elements; and control means for, based on a position desired to be printed with the printing pattern data, controlling a feed amount desired to be attained by the feed means and controlling the correspondence change means to change the correspondence into a desired correspondence.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
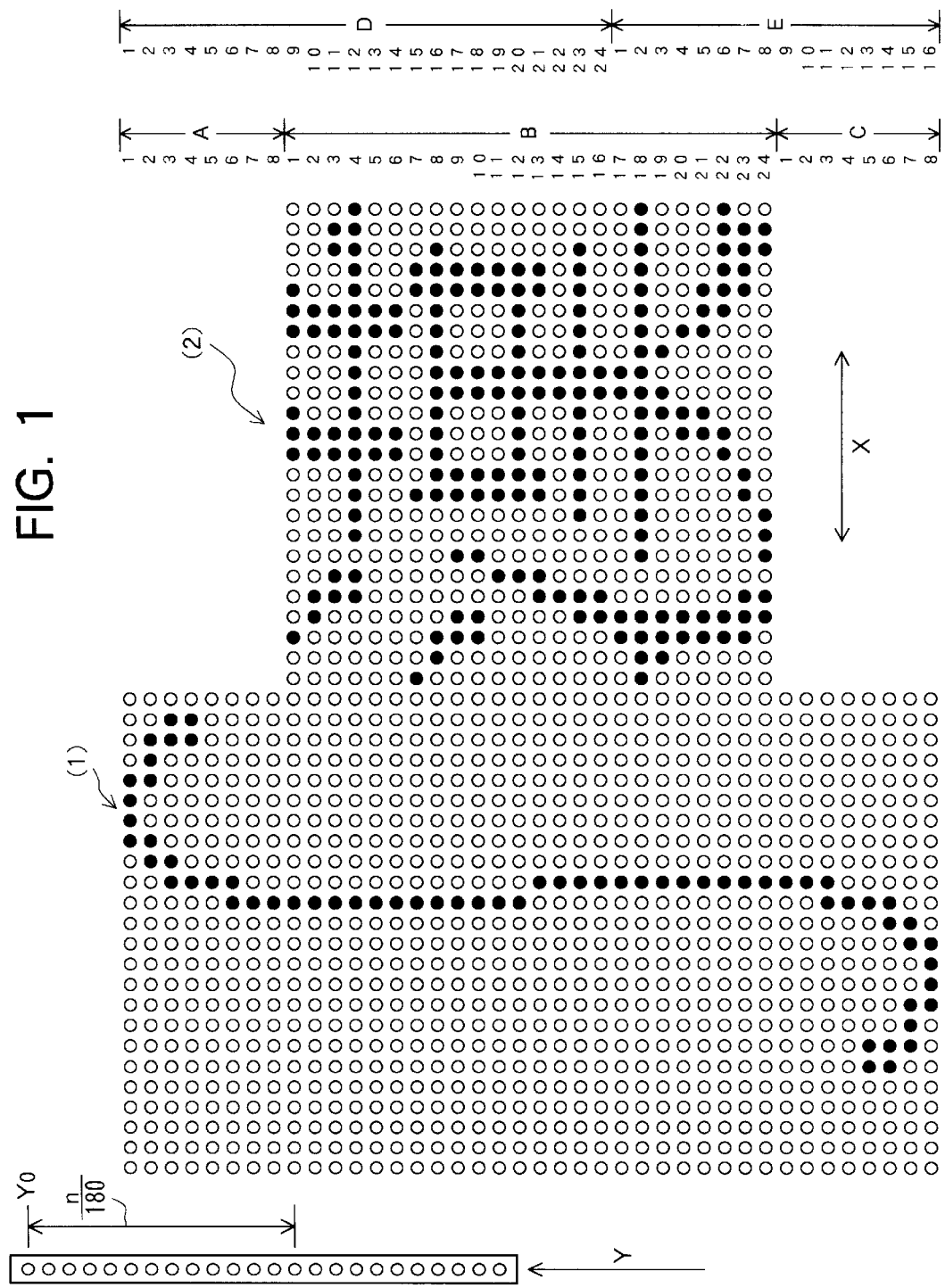
FIG. 1 illustrates how to print one line image through a conventional printing operation.

A printing system according to preferred embodiments of the present invention will be described while referring to the accompanying drawings wherein like parts and components are designated by the same reference numerals.

Figure 2:
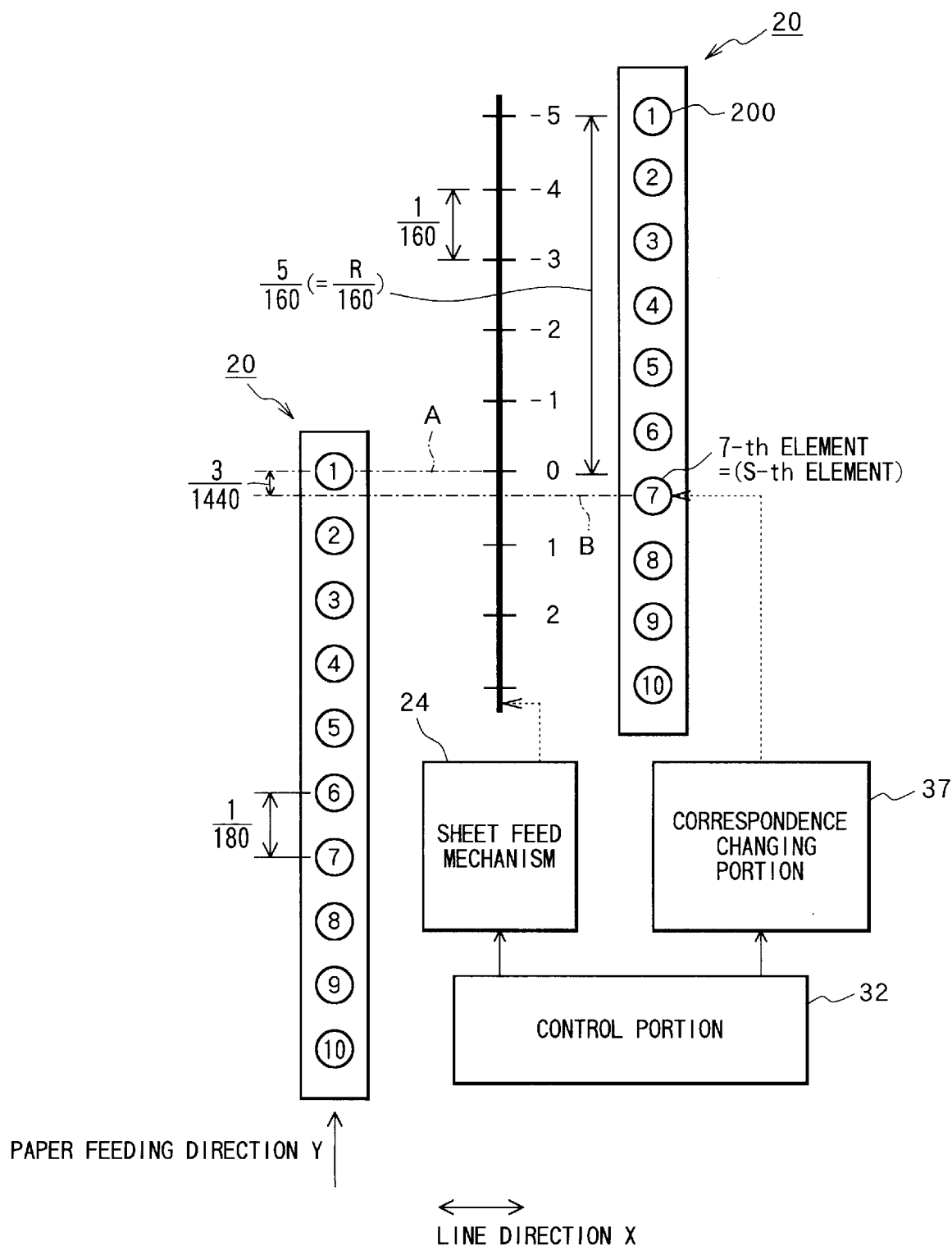
FIG. 2 schematically illustrates a mechanism employed in the present invention.

A basic mechanism employed in the printing system of a first embodiment of the present invention will be described below with reference to FIG. 2.

The print head 20 has a plurality of printing elements 200. The printing elements 200 are aligned substantially along the sheet feeding direction Y (vertical direction) at a basic pitch P of 1/180 inch, for example. The printing elements 200 are numbered 1 through 10. The uppermost element is numbered 1 and the lowermost element is numbered 10. The print head 20 is actuated while the print head 20 is conveyed in the line printing direction X. The print head 20 can therefore print out a line image having a height equal to the length of the print head 20. A sheet feeding mechanism 24 is constructed to feed a printing medium (sheet of paper) along the sheet feeding direction Y at a sheet feed pitch F of 1/160 inch which is different from the basic pitch P.

It is now assumed that the print head 20 is initially located with its uppermost printing element (which is numbered 1) confronting a position A on the sheet. The uppermost printing element prints a dot at the position A. Then, the sheet is fed downwardly, i.e., in a rearward direction by a distance of 5/160 inches. As a result, the seventh printing element will confront a position B on the sheet. The seventh printing element prints a dot at the position B. It is noted that the position B is away from the position A by a distance of 3/1440 inches. Thus, though the sheet is fed by a 1/160 inch unit, a dot can be printed on a position which is shifted from the already-printed dot by a distance less than the 1/160 inch.

Generally, when the sheet is fed from the initial position by a sheet feeding amount of R/160 inches, a S-th printing element (where 1≦S) will confront a position which is away from the initial position of the first printing element by a certain distance. This distance has an amount equal to a sum of the sheet feeding amount, R/160 inches, and the distance, (S−1)/180 inches, defined between the first printing element and the S-th printing element.

The distance is expressed by the following formula (1):

$$n/1440 = (S-1)/180 + R/160 \quad (1)$$
$$= 8(S-1)/1440 + 9R/1440$$

where n and S are integers equal to or greater than 1, and R is an integer. When R is a positive number, the sheet feed amount R/160 indicates that the sheet is fed in the forward direction by the amount of R/160 inches. When R is a negative number, the sheet feed amount R/160 indicates that the sheet is fed in the rearward direction by the amount of R/160 inches. In the above-described example, when the sheet is fed 5/160 inches in the rearward direction, the seven-th printing element will confront the position B which is away from the initial position A by the distance of 3/1440 inches (=(7−1)/180−5/160).

According to the present invention, therefore, when it is desired to print a dot on a position C which is away from the initial position A of the first printing element by a distance of n/1440 inches, the combination of S and R, that satisfy the above equation (1), are calculated or selected from Table 1 below. The position C will be printed with the thus determined S-th printing element after the sheet is fed by a distance of R/160 inches.

TABLE 1

| "n" of Dot Printing Position n/1440 inches | Number "S" of S-th Printing Element | "R" of Sheet Feeding Amount R/160 inches |
|---|---|---|
| 1 | 9 | −7 |
| 2 | 8 | −6 |
| 3 | 7 | −5 |
| 4 | 6 | −4 |
| 5 | 5 | −3 |
| 6 | 4 | −2 |
| 7 | 3 | −1 |
| 8 | 2 | 0 |
| 9 | 1 | 1 |

According to the present invention, therefore, it is possible to print an image having a dot density of a highest common divisor, 1/1440 inch, of the feed pitch F, 1/160 inch, and the basic pitch P, 1/180 inch.

It is noted that because the equation (1) is determined by the combination (S, R) of the two values S and R, a plurality of variations (S, R) can be determined as satisfying the equation (1).

Figure 3:
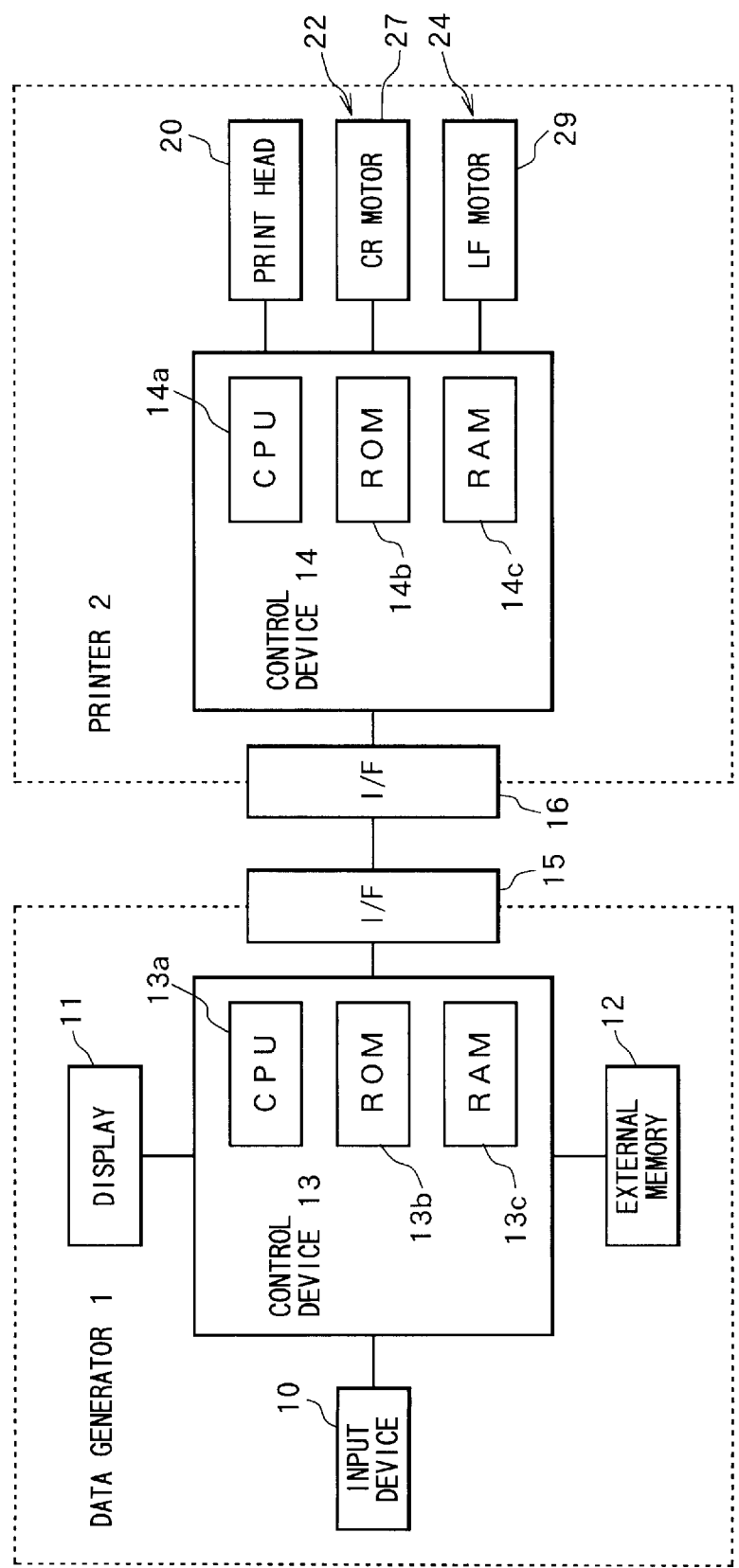
FIG. 3 is a block diagram of a printing system of a first embodiment of the present invention.

FIG. 3 shows a schematic structure of a printing system for performing the above-described printing mechanism. The printing system is constructed from a data generator 1 and a printer 2 connected via a cable. The data generator 1 is constructed from a personal computer or the like. The printer 2 is for printing data supplied from the data generator 1 onto a printing medium such as a sheet of paper.

The data generator 1 is constructed from: an input device 10 such as a key board; a display 11 such as a CRT and a liquid crystal display; an external storage device 12 such as a hard disk and a floppy disk; an interface circuit (I/F) 15; and a control device 13 constructed from a central processing device (CPU) 13a, a read only memory (ROM) 13b, and a random access memory (RAM) 13c. The ROM 13a stores therein several processing programs.

When the data generator 1 is activated, an operation system, such as a window system, is loaded down to the RAM 13c from the external storage device 12. Various types of drivers, such as a printer driver, are also loaded down to the RAM 13c from the external storage device 12. When instructed from the input device 10 to print a desired pattern, the control device 13 produces desired data including print data and control data. The print data is in the form of either code data or bit map data. The printer driver supplies the print data and the control data to the printer 2 via the interface circuit 15.

The printer 2 is constructed from: an interface circuit (I/F) 16 connected via the cable to the interface circuit 15 of the data generator 1, a control device 14, the print head 20, the sheet feeding mechanism 24, and a head conveying mechanism 22. The control device 14 is constructed from a CPU 14a, a ROM 14b stored with various processing programs, a RAM 14c, a hardware circuit, and the like. The print head 20 is controlled by the control device 14.

Figure 4:
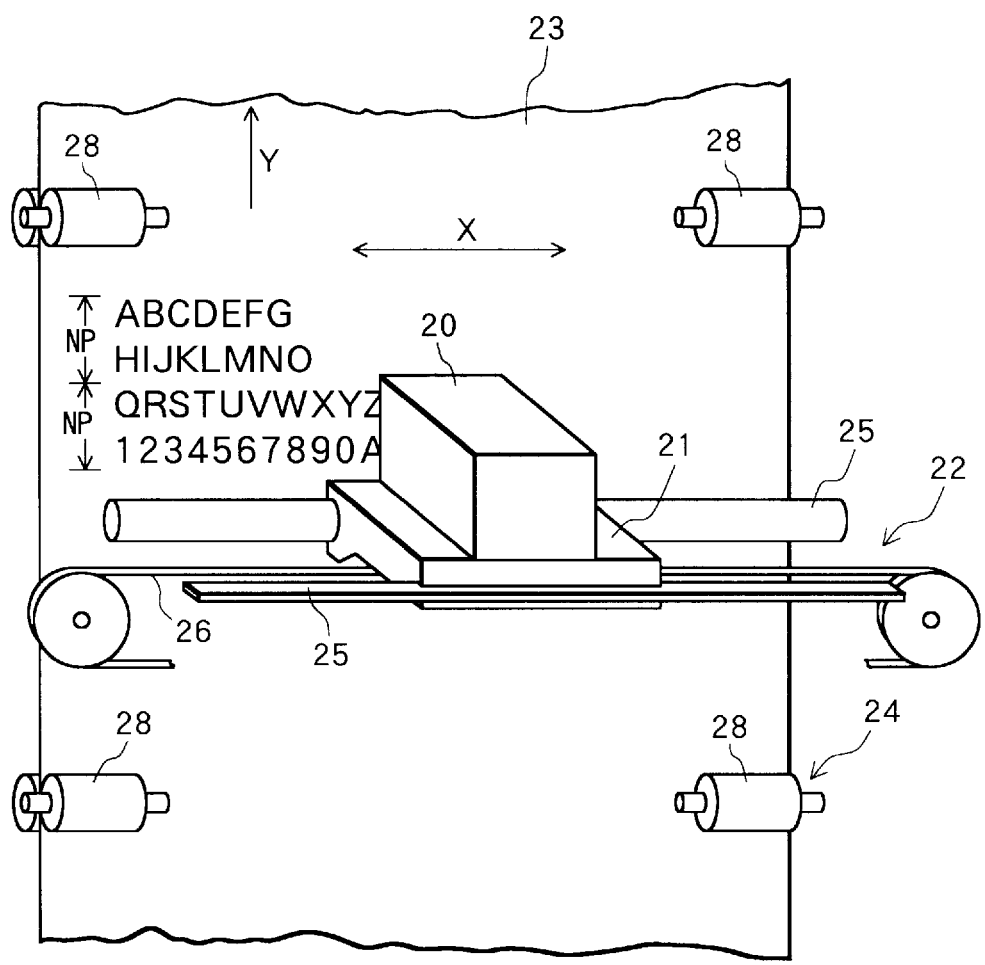
FIG. 4 schematically shows a printer employed in the printing system of FIG. 3.

FIG. 4 schematically shows a mechanical structure of the printer 2. The print head 20 is mounted to a carriage 21, which is reciprocatingly movable by the head conveying mechanism 22 in the horizontal direction (line printing direction) X parallel to the sheet of paper 23. Every time the print head 20 is moved entirely over the width of the sheet of paper 23, the sheet of paper 23 is fed by the sheet feeding mechanism 24 in the vertical direction (sheet feeding direction) Y perpendicular to the line printing direction X.

In the head conveying mechanism 22, the carriage 21 is movably held on a pair of guide bars 25. The carriage 21 is fixed to a belt 26 which is driven with a carriage (CR) motor 27 shown in FIGS. 3 and 5. When the motor 27 is powered, the carriage 21 is driven by the belt 26 to reciprocatingly move along the pair of guide bars 25.

Figure 5:
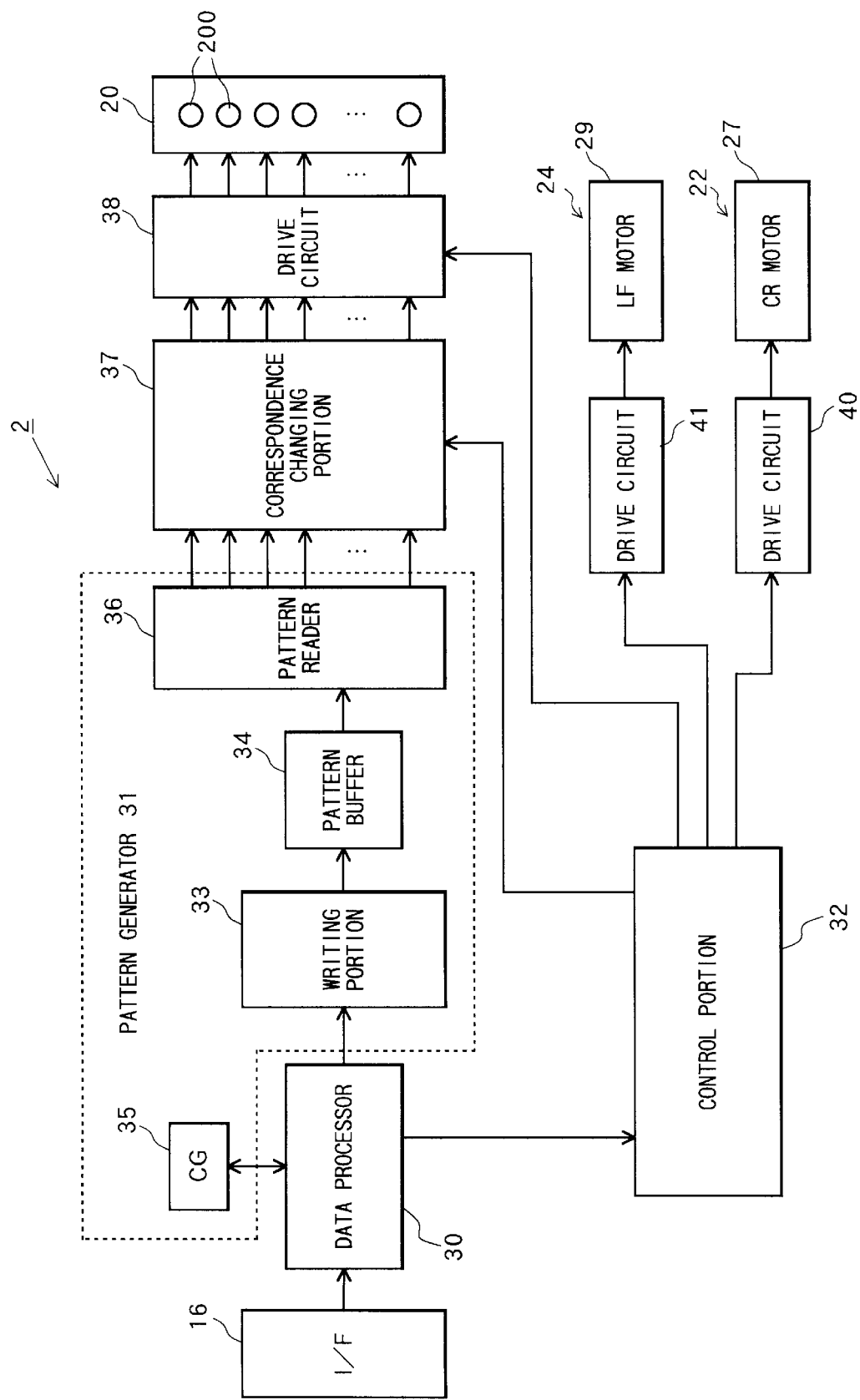
FIG. 5 is a block diagram of the printer employed in the printing system of FIG. 3.

In the sheet feeding mechanism 24, a plurality of feed rollers 28 are provided rotatably about their rotational axes. The rollers 28 are positioned relative to the sheet of paper 23 so that the rotational axes extend parallel to the paper 23. As shown in FIGS. 3 and 5, a line feed (LF) motor 29 is provided to drive these rollers 28. When the LF motor 29 is powered, the feed rollers 28 feed the sheet of paper 23 by a pitch (sheet feed pitch F) of 1/160 inch.

The print head 20 has a plurality of printing elements 200. The total number of the printing elements 200 is, for example, N (N is an integer >1.) The printing elements 200 are aligned substantially along the sheet feeding direction Y (i.e., vertical direction.) The printing elements 200 are numbered from 1 to N. The uppermost element is numbered 1, and the lowermost element is numbered N. The printing elements 200 are arranged at a basic pitch P along the sheet feeding direction Y. For example, the basic pitch P is equal to 1/180 inch. The length of the print head in the vertical direction Y is therefore about the product of N and P, and has a value twice as large as the height of a normal line image, for example. Accordingly, two line images can be produced as shown in FIG. 4 while the print head 20 is moved only once in the line printing direction X. After the two line images are produced, the rollers 28 feed the sheet of paper 23 upwardly, i.e., in the forward direction. Then, the print head 20 prints out next two line images below the already-printed two line images.

The print head 20 is, for example, an ink jet print head. The printing elements 200 are constructed from nozzles provided to the print head.

FIG. 5 is a block diagram of an electronic structure of a part of the printer 2. The printer 2 includes: a data processing portion 30, a pattern generating portion 31, a control portion 32, a correspondence changing portion 37, a print head drive circuit 38, the print head 20, an LF motor drive circuit 41, the LF motor 29, a CR motor drive circuit 40, and the CR motor 27. The control portion 32 stores therein the above-described Table 1. The pattern generating portion 31 includes a character generator 35, a writing portion 33, a pattern buffer 34, and a pattern reader 36.

The data processing portion 30 is for receiving data produced at the data generator 1 through the interface circuit 16. The data processing portion 30 is also for judging whether the received data is either one of print data and control data. When the data is print data, the data processing portion 30 transfers the data to the pattern generating portion 31. The pattern generating portion 31 will produce a print pattern data based on the print data. When the data is control data, on the other hand, the data processing portion 30 transfers the data to the control portion 32. It is noted that the data processing portion 30 supplies the control portion 32 also with the print data. Based on the supplied control data and print data, the control portion 32 will produce control data for controlling the print head 20, the LF motor 29, and the CR motor 27.

The pattern generating portion 31 will be described in greater detail below.

When the supplied print data is bit map data, the bit map data is constructed from a plurality of dot data for printing one line image. Accordingly, the writing portion 33 writes the bit map data into the pattern buffer 34 as one line pattern data. The one line pattern data is temporarily stored in the pattern buffer 34. When the print data is character code data, the writing portion 33 reads out a pattern data from the character generator 35 in accordance with the character code. The writing portion 33 writes the thus read out pattern data into the pattern buffer 34 as one line pattern data. This one line pattern data is also constructed from a plurality of dot data for printing one line image.

The pattern reader 36 is for reading one column worth of data from the one line pattern data from the pattern buffer 34 every time the print head 20 is conveyed by the basic pitch P in the line direction X. The one column worth of data includes a set of dot data desired to be printed along the sheet feeding direction Y. The pattern reader 36 therefore reads out this one columnar set of data from the buffer 34 in correspondence with the arrangement of the printing elements 200. The pattern reader 36 then outputs the thus read out one columnar set of data to the correspondence changing portion 37.

The control portion 32 is for producing information indicating which of the printing elements 200 should be used to print each dot data constituting the one columnar set of dot data. In other words, the control portion 32 produces information on a correspondence between each dot data constituting the one columnar set of dot data and a printing element 200. The information is determined based on the Table 1.

Receiving the one columnar set of dot data from the pattern reader 36, the correspondence changing portion 37 changes the arrangement of dot data in accordance with the information supplied from the control portion 32. Thus, the correspondence between each dot data and a printing element 200 is changed into that as required by the Table 1. For example, a first dot data within the one columnar set of dot data may be allotted to a first (uppermost) printing element 200 or to another printing element 200 listed in the middle column of the Table 1. The correspondence changing portion 37 then outputs the one columnar set of dot data to the drive circuit 38.

The control portion 32 is for producing head convey data for conveying the print head 20 at a predetermined velocity in the line direction X. The control portion 32 produces the head convey data based on the print data and the control data supplied from the data processing portion 30. The control portion 32 supplies the head convey data to the CR motor drive circuit 40. The CR motor drive circuit 40 will drive the CR motor 27 based on the supplied head convey data.

The control portion 32 also produces head drive data for driving the print head 20 every time the print head 20 is conveyed by the CR motor 27 by the basic pitch. The control portion 32 produces the head drive data also based on the print data and the control data supplied from the data processing portion 30. The control portion 32 supplies the head drive data to the drive circuit 38.

When receiving the head drive data from the control portion 32, the drive circuit 38 drives the print head 20 to actuate the printing elements 200 in accordance with the dot data supplied from the correspondence changing portion 37.

It is noted that because the control data supplied from the data processing portion 30 includes feed data, the control portion 32 produces sheet feed data for feeding the sheet of paper 23 by a certain amount of distance. The control portion 32 determines the amount of distance in accordance with data in the Table 1. The control portion 32 supplies the sheet feed data to the LF motor drive circuit 41. The LF motor drive circuit 41 will drive the LF motor 29 based on the supplied sheet feed data.

Figure 6:
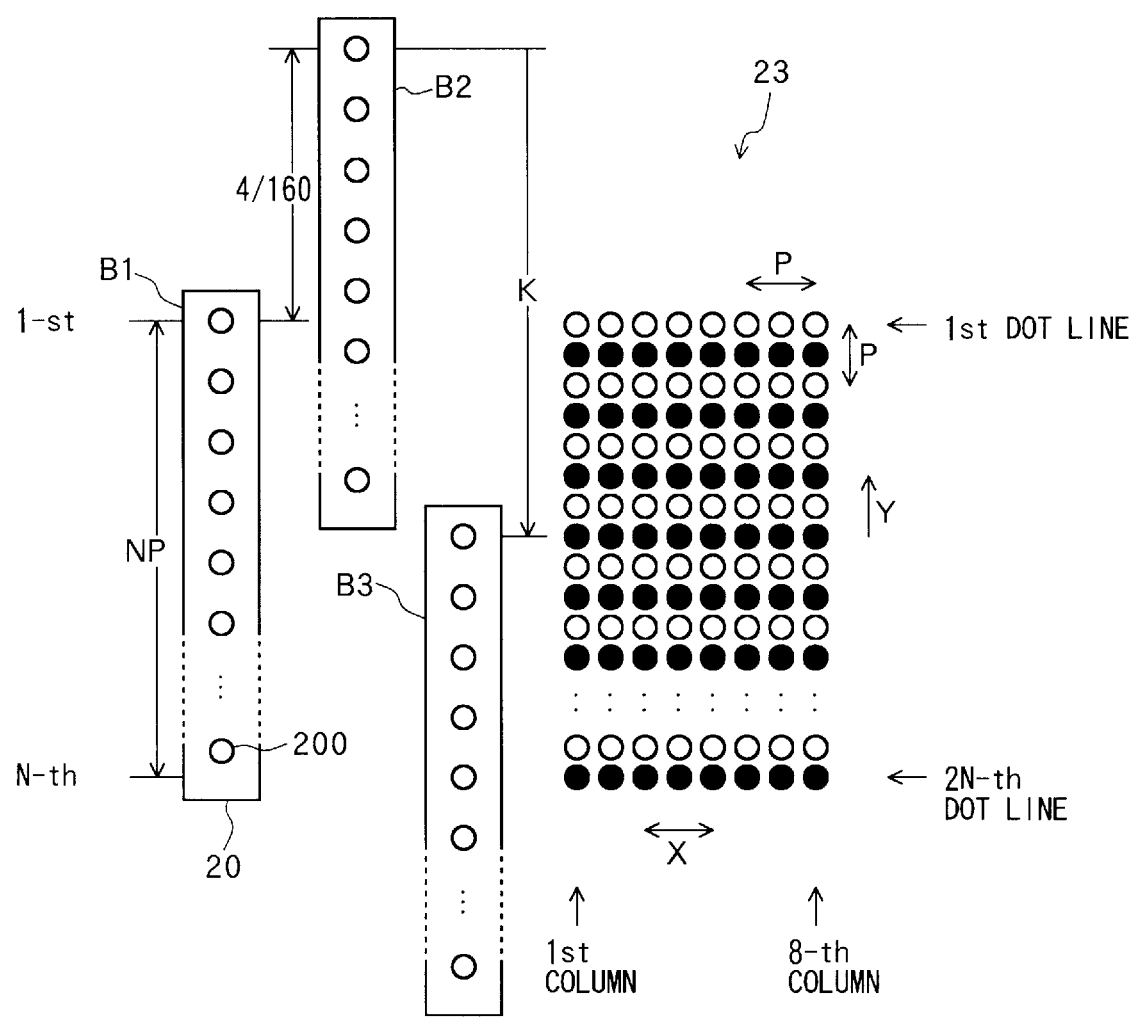
FIG. 6 illustrates one example of a manner how to print dots according to the first embodiment.

FIG. 6 shows one example of a dot image printed by the above-described printing system. In this dot image, black dot lines are printed between two successive white dot lines, so that a dot density is made twice the basic pitch P in the sheet feeding direction Y. In this case, in order to make the dot density twice the basic pitch P also in the line printing direction X, the head conveying mechanism 22 is controlled to convey the print head 20 at a half of a normal speed. It is noted that this dot image is comprised of 2N dot lines each of which extends in the horizontal direction X. This image has eight dot columns each of which extends in the vertical direction Y.

Next will be described how to print the image of FIG. 6.

It is assumed that the print head 20 is initially located at an initial position B1 with respect to the sheet of paper 23. The pattern buffer 34 is stored with dot data for this entire dot image.

The pattern reader 36 first reads out, from the pattern buffer 34, dot data located on a first column at odd numbered dot lines (i.e., first, third, . . . , and (2N–1)-th dot lines.) The pattern reader 36 then supplies the dot data as one columnar set of data to the correspondence changing portion 37. The control portion 32 instructs the correspondence changing portion 37 to allot the supplied one columnar set of data to the printing elements 200 from number 1 to N. As a result, dot data located on the first, third, . . . , and (2N–1)-th dot lines at the first column are respectively allotted to the printing elements numbered 1 to N. The control portion 32 further controls, via the drive circuit 38, the printing elements 200 to print a first dot column in accordance with the supplied set of dot data.

Then, the control portion 32 controls the head conveying mechanism 22 via the components 40 and 27 to convey the print head 20 in the line printing direction X. When the print head 20 is conveyed half the basic pitch P, the pattern reader 36 reads out the next column at the odd numbered lines as a next columnar set of data, so that the next dot column is printed in the same manner as described above. Thus, every time the print head 20 is conveyed half the basic pitch P, a dot column is printed based on the data of the odd numbered lines. As a result, white dot lines are printed as shown in FIG. 6.

Next, in order to print dots at positions shifted from the white dot lines by a distance of 1/360 (=4/1440) inch, the control portion 32 determines the values of S and R as 6 and –4, respectively, based on the Table 1. The pattern reader 36 reads out, from the pattern buffer 34, dot data located on the first column at even numbered dot lines (i.e., second, fourth, . . . , and 2N-th lines.) The pattern reader 36 then supplies those data as one columnar set of data to the correspondence changing portion 37. The control portion 32 instructs the correspondence changing portion 37 to allot the supplied one columnar set of data to the printing elements numbered 6 to N. As a result, dot data located on the second, fourth, . . . , and (2N–10)-th lines at the first column are respectively allotted to the printing elements numbered 6 to N. The control portion 32 further controls the sheet feeding mechanism 24 via the components 41 and 29 to feed the sheet of paper 23 by the distance of 4/160 inches in the rearward direction, i.e., downwardly. As a result, the print head 20 is moved to a position B2 relative to the sheet of paper 23. The control portion 32 further controls, via the drive circuit 38, the 6th to N-th printing elements 200 to print a first dot column in accordance with the supplied dot data.

Then, the control portion 32 controls the head conveying mechanism 22 via the components 40 and 27 to convey the print head 20 in the line printing direction X. When the print head 20 is conveyed half the basic pitch P, the pattern reader 36 reads out the next column at the even numbered lines as a next columnar set of data, so that the next dot column is printed in the same manner as described above. Thus, every time the print head 20 is conveyed half the basic pitch P, a dot column is printed based on the data of the even numbered lines. Thus, black dot lines are printed in the upper part of the dot image of FIG. 6. The total number of the thus printed black dot lines is N–5.

In order to print five more black dot lines in the remaining lower part of the dot image, the control portion 32 first calculates a distance K required to feed the sheet of paper 23 in the forward direction and to enable the print head 20 to print black dot lines in the lower part of the image. The distance K is equal to the length of the print head 20, i.e., N/180 inches. Then, in the same manner as described above, the control portion 32 determines the values R and S which satisfy the following equation (2):

$$K=8N/1440=R/160+(S-1)/180 \qquad (2)$$

Because this equation (2) is the same as the equation (1) where n=8N, the R and S can be determined through searching the values R and S in the Table 1 for the value of n (=8N).

For example, when the print head 20 has sixty printing elements 200 in total, the sheet of paper 23 may be fed by 48/160 inches upwardly. The printing elements 200 from number 7 to 11 will be used for printing the five black lines.

When the total number of the printing elements 200 is the multiple of nine, the sheet of paper 23 can be fed so that the print head 20 reaches the position B3 shown in FIG. 6 where the first printing element 200 will properly confront the uppermost position of the unprinted region. This is because the number "nine" is a ratio of the sheet feed pitch F (1/160) with regards to the highest common divisor (1/1440) of the basic pitch P and the sheet feed pitch F. Accordingly, when N is the multiple of nine, S satisfying the equation (2) can be set to one. In this case, the printing elements 200 from number 1 to 5 can be used for printing the five dot lines.

As described above, in the present embodiment, the printing elements 200 are arranged with the basic pitch P of 1/180 inch. The sheet feeding mechanism 24 can feed the sheet of paper 23 at the sheet feed pitch F of 1/160 inch. The sheet feeding mechanism 24 is controlled to feed the sheet of paper 23 by a distance of R/160 inches, and a desired data is allotted to a S-th printing element 200. When the values R and S satisfy the equation (1), the S-th printing element can print a dot at a position n/1440 inches away from an initial position at which the first printing element is initially located. Thus, the printing system can print dots at a dot density of 1/1440 inch which is the highest common divisor of the values 1/60 inch and 1/180 inch.

In the above description, the sheet 23 is fed relative to the print head 20 so that the print head 20 moves from the position B1 toward the position B2 and then toward the position B3. However, the sheet of paper 23 may be fed so that the print head 20 is first located on the position B2, and then moved toward the position B1 and the position B3. In this case, the sheet of paper 23 can be fed only in the forward direction. The paper 23 can therefore be fed at a higher precision.

It is additionally noted that the combinations (S, R) are not limited to those listed in the Table 1. The sheet of paper 23 may be fed only in the forward direction also through properly selecting the values S and R.

Figure 7:
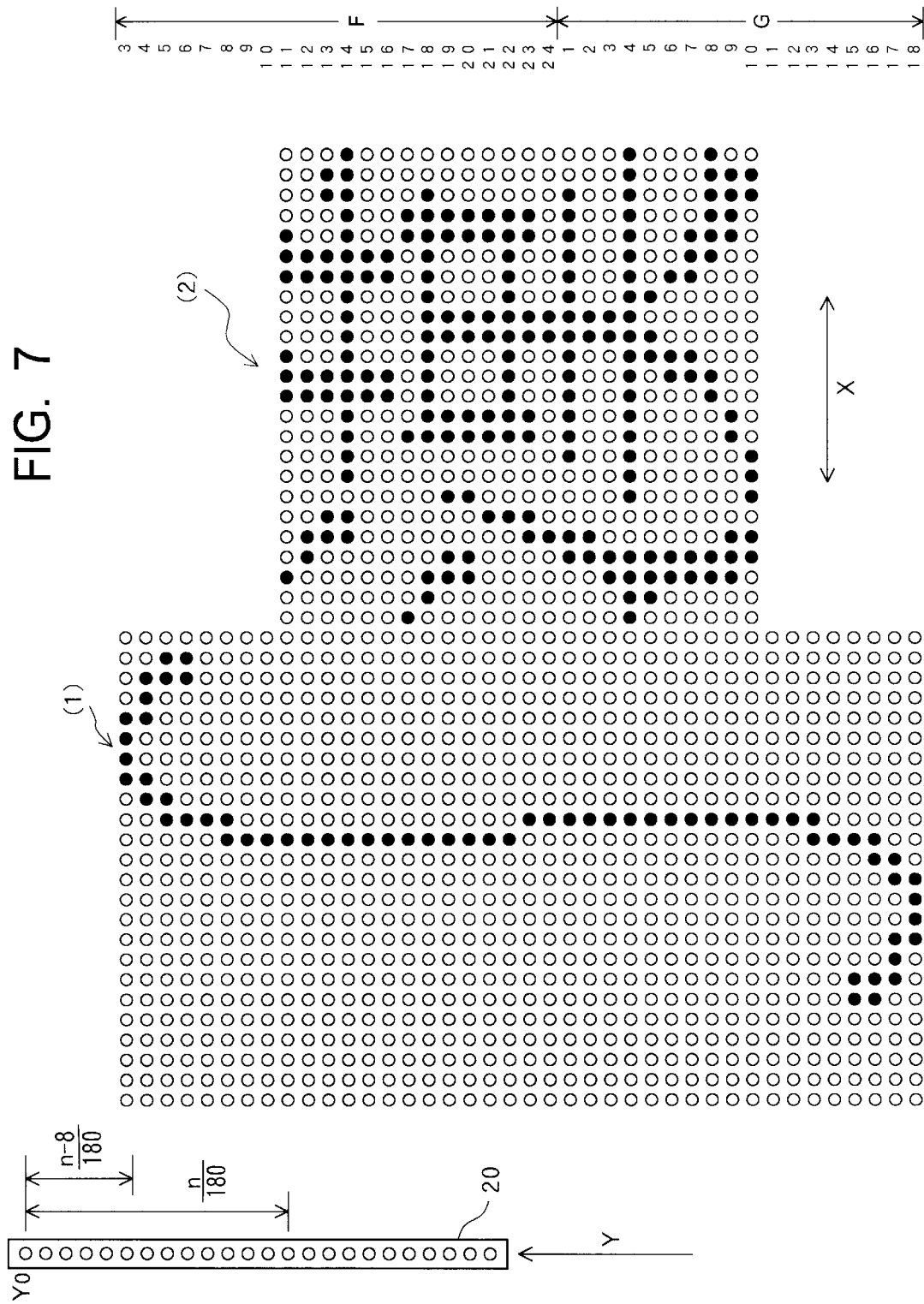
FIG. 7 illustrates another example of the manner how to print dots according to the first embodiment.

FIG. 7 shows another example of a dot image obtained by the printing system of the present embodiment.

It is assumed that the twenty four printing elements 200 are arranged on the print head 20 at the basic pitch P of 1/180 inch in the sheet feeding direction Y. In this example, the sheet feeding mechanism 24 is constructed to feed the sheet of paper 23 at a pitch of 1/60 inch. The dot image desired to be printed is the same as that shown in FIG. 1, and includes the mathematical mark "$f$" and the kanji character as indicated by (1) and (2), respectively. Similarly in the example of FIG. 1, the print head is initially located with its uppermost printing element being positioned at the position Y0. The distance between the position Y0 and the area where the kanji character (2) is desired to be printed is n/180 inches. In this case, the uppermost position of the mathematical mark "$f$" is away from the head initial position by a distance of (n–8)/180 inches.

In order to print dots on the uppermost position of the mathematical mark "$f$," therefore, the combination values (S, R) are determined by the following equation (3):

$$(n-8)/180=(S-1)/180+3R/180 \qquad (3)$$

For example, when n is equal to 61, S is determined as 3, and R is determined as 17. Accordingly, the printing operation is performed as follows:

1) The sheet of paper 23 is first fed in the forward direction by an amount of 17/60 inches.

2) The printing elements 200 numbered 3 to 24 are used to print an upper section F of the line image.

3) Then, the sheet of paper 23 is fed in the forward direction by a distance of 24/180 (=8/60) inches which is equal to the length of the print head 20.

4) Then, the printing elements numbered 1 to 18 are used to print a lower section G of the line image.

It is noted that in this case, a ratio of the feed pitch F (1/60 inch) relative to the basic pitch P (1/180 inch) is equal to 3. When the amount (n–8) is divided by 3, a quotient "p" and a remainder "q" are defined as certain values. Accordingly, the above-described printing processes 1)–4) can be interpreted as the following processes 1)–4).

1) The sheet of paper 23 is first fed by an amount of p/60 inches in the forward direction.

2) The printing elements numbered (q+1) to 24 are used to print the section F.

3) Then, the sheet of paper 23 is fed by an amount of 8/60 inches in the forward direction.

4) The remaining eighteen-dot section G is printed.

As apparent from the above, even though the sheet of paper 23 is fed at the pitch of 1/60 inch which is three times as large as the basic pitch P of 1/180 inch, dots can be printed with a pitch of the highest common divisor, 1/180 inch (i.e., the basic pitch), of these two pitches.

Figure 8:
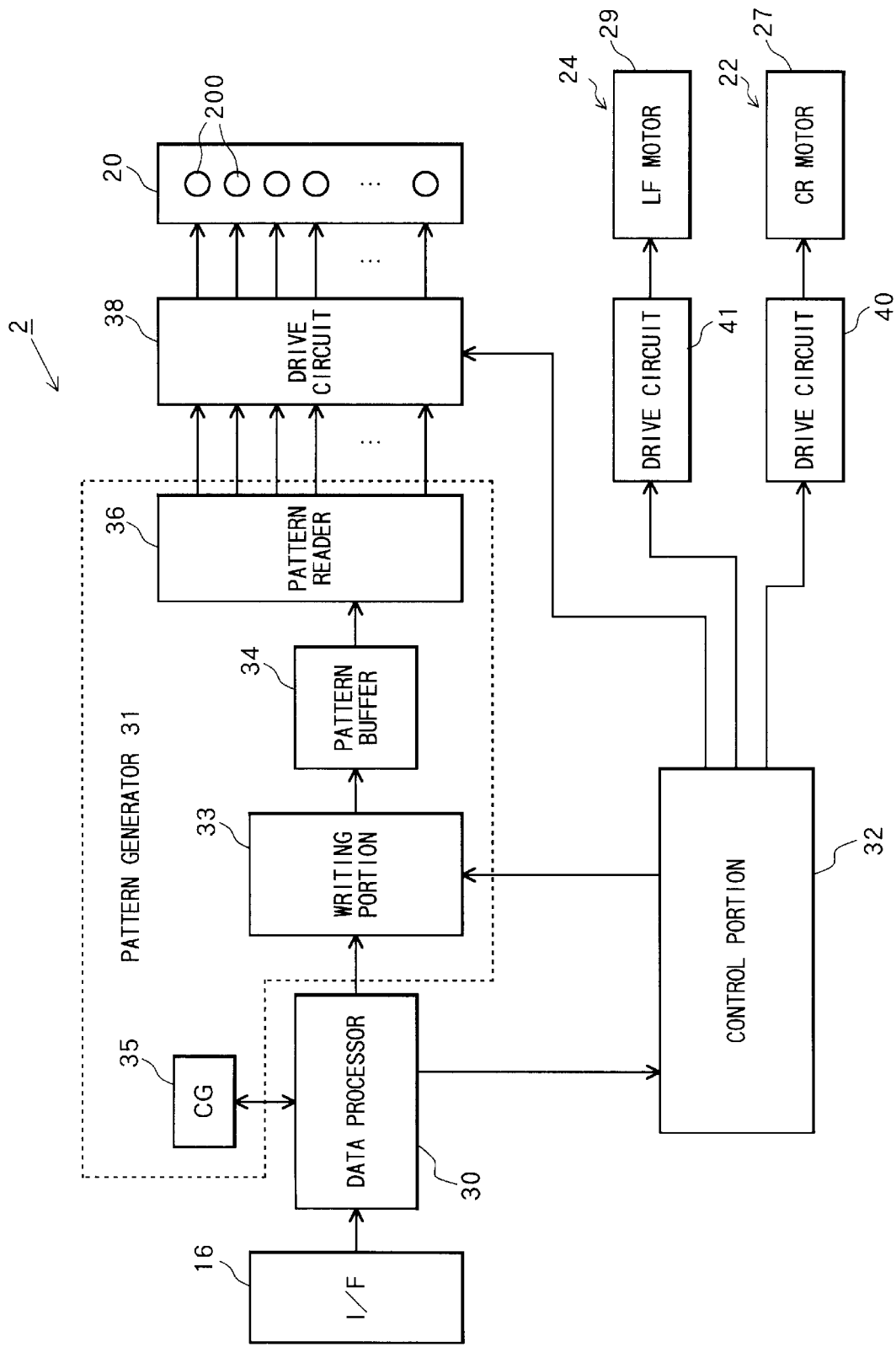
FIG. 8 is a block diagram of the printer employed in the printing system according to a second embodiment.

FIG. 8 shows the electronic structure of a printer 2 according to a second embodiment of the present invention.

In this embodiment, the correspondence changing portion 37 is not provided in the printer 2. Instead, the writing portion 33 writes dot data into the pattern buffer 34 while changing the positions of the respective dot data in the sheet feeding direction Y. Accordingly, when one columnar set of dot data is read out by the pattern reader 36, data constituting the read out columnar set is already properly allotted to the printing elements 200 as required by the Table 1.

Thus, in this embodiment, the writing portion 33 also serves as the correspondence changing portion 37. Except for this respect, the printing system of the present embodiment is the same as that of the first embodiment. Thus, the printing system of the present embodiment can perform the same printing operation as that of the first embodiment.

Figure 9:
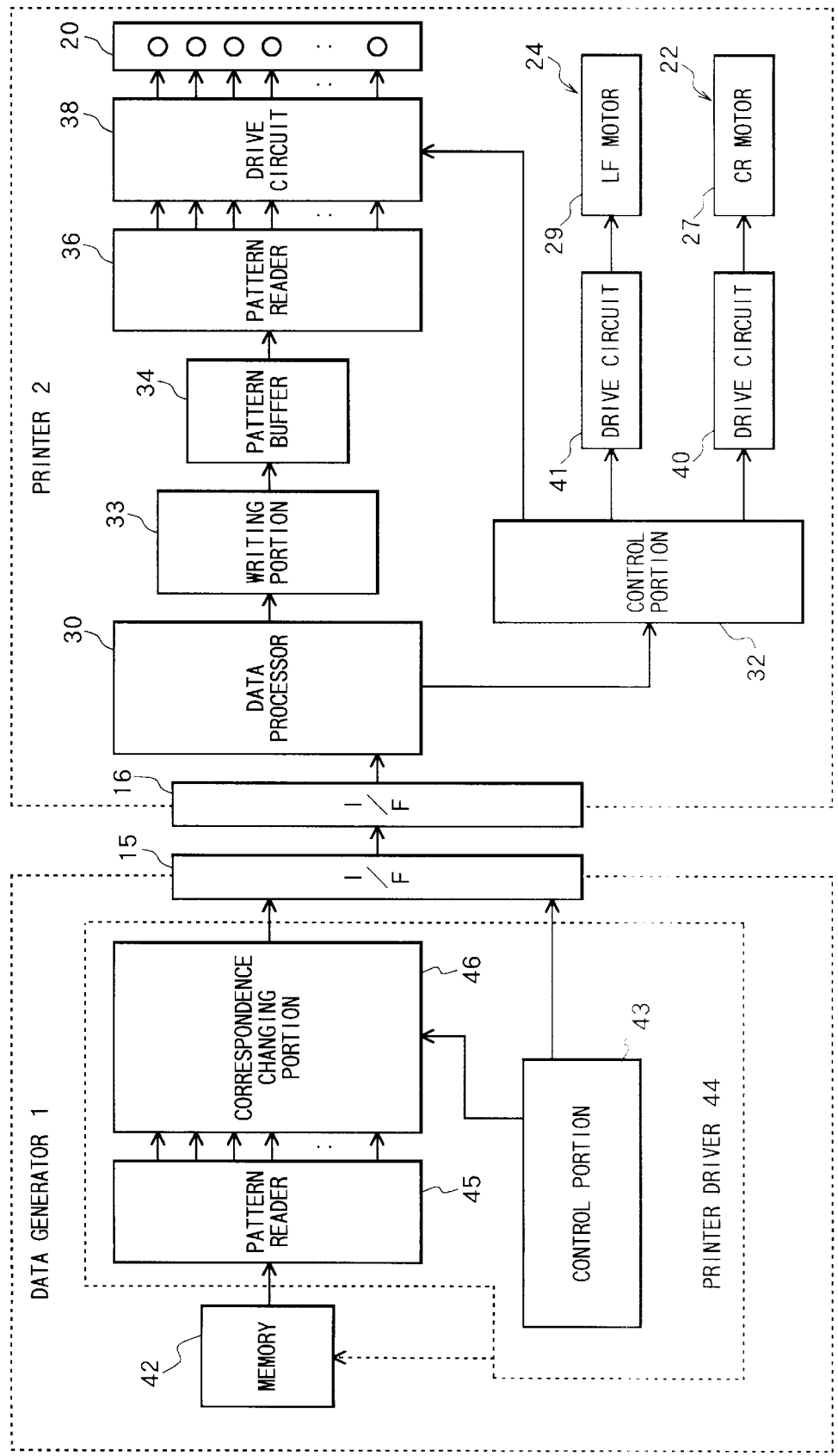
FIG. 9 is a block diagram of the printing system according to a third embodiment.

FIG. 9 shows the electronic structure of a printing system according to a third embodiment of the present invention.

In the first embodiment, the pattern reading operation and the correspondence changing operation are performed in the printer 2. Contrarily, according to the present embodiment, they are performed in the data generator 1. Except for this point, the printing system of the present embodiment has the same structure as that of the first embodiment shown in FIGS. 3 and 4.

In this embodiment, the correspondence changing portion 37 (referred to as 46 in this embodiment) is provided in a printer driver 44 provided in the data generator 1. The printer driver 44 is loaded down to the RAM 13c from the external storage device 12. When the input device 10 inputs a printing instruction, a data generating portion (not shown in the drawing) in the data generator 1 produces data for printing a desired pattern. The printer driver 44 develops the data into bit map data which is constructed from a plurality of dot data for printing dots. The bit map data is temporarily stored at a predetermined memory area 42 in the RAM 13c.

In the printer driver 44, the pattern reader 45 is provided to read out dot data from the memory area 42 one byte by one byte in a raster direction. The correspondence changing portion 46 is controlled by the control portion 43 to change the correspondence between the printing elements 200 and respective dot data constituting the read out one byte data. The correspondence changing portion 46 then outputs the dot data toward the printer 2. The control portion 43 also supplies the printer 2 with data for controlling the CR motor 27 and the LF motor 29. Thus, the memory area 42 and the pattern reader 45 serve as the pattern generating portion 31 of the first embodiment.

In the printer 2, the dot data supplied from the data generator 1 is temporarily stored in the pattern buffer 34 while the correspondence between the respective data and the printing elements 200 remain unchanged. In the same manner as in the first embodiment, the pattern reader 36 reads out those data one column by one column. Thus, printing operation can be performed in the same manner as described in FIGS. 6 and 7.

In the above-described embodiments, the sheet feeding pitch F is different from the printing element arranging pitch P. When the sheet feeding pitch F is a multiple of the printing element arranging pitch P as described in the example of FIG. 7, dots can be printed still at the printing element arranging pitch P. Even when the sheet feeding pitch F is not either a multiple or a measure of the printing element arranging pitch P as described in the first example of FIG. 6, dots can be printed with a pitch smaller than both the printing element arranging pitch P and the sheet feeding pitch F.

While the invention has been described in detail with reference to the specific embodiments thereof, it would be apparent to those skilled in the art that various changes and modifications may be made therein without departing from the spirit of the invention.

In the above-described embodiments, the printing elements are arranged at the pitch of 1/180 inch, and the sheet of paper 23 is fed at the pitch of 1/160 inch or 1/60 inch. However, these values of pitches can be freely selected. Because the sheet feeding pitch is different from the printing element arranging pitch, dots can be printed at a pitch of the highest common divisor of the sheet feeding pitch and the printing element arranging pitch. Especially when the sheet feeding pitch is set larger than the printing element arranging pitch, the entire printing system can be made cheap. The printing system can perform its printing operation at a high speed.

In the first and second embodiments, the data processing portion 30, the pattern generator 31, and the correspondence changing portion 37 are provided to the printer 2. However, they may be provided to the data generator 1.

In the above-description, the conveying mechanism 22 conveys the print head 20 in the horizontal direction X relative to the sheet of paper 23, and the feeding mechanism 24 feeds the paper 23 in the vertical direction Y relative to the print head 20. However, the conveying mechanism 22 may be constructed to convey the print head 20 in the vertical direction Y, and the feeding mechanism 24 may feed the paper 23 in the horizontal direction X. The conveying mechanism 22 may be constructed to convey the print head 20 both in the horizontal and vertical directions X and Y. Alternatively, the feeding mechanism 24 may feed the paper 23 both in the horizontal and vertical directions X and Y.

In the above-described embodiments, the printing elements 200 are aligned substantially along the sheet feeding direction Y. However, the printing elements 200 may be arranged slanted relative to the sheet feeding direction Y. The printing elements 200 may also be arranged in a staggered manner. Still in this case, the basic pitch P is defined as the distance between two adjacent printing elements 200 along the sheet feeding direction Y.

When the printing elements 200 are thus arranged in the slanted or staggered manner, the pattern reader 36 may not simultaneously output the entire columnar set of dot data. The timing at which the pattern reader 36 outputs each dot data may be controlled in accordance with a position of the corresponding printing element 200. Alternatively, the pattern reader 36 may convert each dot data in accordance with the position of the printing element 200, and may simultaneously output all the dot data.

In the above-described embodiments, the print head 20 is constructed from the ink jet print head. However, the print head 20 can be constructed from other various types of dot matrix type print head. For example, the print head 20 may be constructed from a dot impact type head. In this case, the printing elements 200 are constructed from impact wires. The print head 20 may otherwise be constructed from a thermal head. In this case, the printing elements 200 are constructed from thermal elements.

As described above, according to the dot matrix printing system, the basic pitch P, at which the printing elements are arranged, is different from a feed pitch F, at which the sheet is fed relative to the print head. According to a position at which a printing pattern is desired to be printed, a feed amount of the sheet relative to the print head is determined, and a correspondence between the arrangement of the printing pattern and the arrangement of the printing elements is changed. It is therefore possible to print dots at a dot density equal to or even lower than the basic pitch P of the printing elements.

Preferably, the printing position can be determined as a common divisor between the printing element arrangement pitch P and the sheet feed pitch F. Even when a position desired to be printed with a dot is shifted from the print head at a distance lower than the sheet feed pitch F, this position can be printed with a dot when the correspondence is changed between the arrangements of the printing pattern and of the printing elements.

Even when the sheet feed pitch F is larger than the printing element arranging pitch P, it is still possible to print dot lines between already-printed two successive dot lines, thereby obtaining an image of a higher printing density. It is also possible to continuously print an image of a size larger than the total number of the printing elements provided to the print head.

The change in the correspondence between the printing pattern and the printing elements can be performed through changing the correspondence between the printing elements and the arrangement of the printing pattern generated in the pattern generator. This correspondence changing operation can also be performed by writing the printing pattern in the pattern buffer while changing the position to which the printing pattern is to be stored.

The correspondence between the printing pattern and the printing elements can be determined in any of the printer, the data generator, and the printer driver.

According to the present invention, the high density printing operation can be attained by using an ink jet print head and a feed mechanism even with a large feed pitch F.

What is claimed is:

1. A dot matrix printing system for printing dots, the system comprising:

a print head having a plurality of printing elements arranged at a predetermined pitch in a direction substantially perpendicular to a line printing direction;

conveying means for conveying one of the print head and a printing medium in the line printing direction relative to the other one of the print head and the printing medium;

feed means capable of feeding, at a feed pitch different from the predetermined pitch, one of the print head and the printing medium relative to the other one of the print head and the printing medium in a feed direction which is perpendicular to the line printing direction;

pattern generating means for generating a printing pattern data desired to be printed by the printing elements;

correspondence change means for changing a correspondence between arrangements of the printing pattern data in the feed direction and of the printing elements; and control means for controlling a feed amount desired to be attained by the feed means and for supplying the correspondence change means with information on a desired correspondence between the arrangements of the printing elements and of the printing pattern data in the feed direction, the feed amount and the information being determined based on a position desired to be printed with the printing pattern data.

2. A dot matrix printing system of claim 1, wherein the pattern generating means includes:

storage means for storing the printing pattern data desired to be printed by the printing elements; and pattern reading means for successively reading the printing pattern data in accordance with the conveyance of the one of the print head and the printing medium;

wherein the correspondence change means changes the correspondence between the arrangements of the printing elements and of the printing pattern data read out by the pattern reading means in the feed direction.

3. A dot matrix printing system of claim 1, wherein the feed pitch is larger than the predetermined pitch at which the printing elements are arranged.

4. A dot matrix printing system of claim 1, wherein the control means determines the desired feed amount and the desired correspondence between the arrangements of the printing elements and of the printing pattern data so that the position desired to be printed with the printing pattern data is defined by a common divisor of the feed pitch and the predetermined pitch.

5. A dot matrix printing system of claim 4, wherein the control means changes the correspondence between the printing pattern data and the printing elements to produce data for printing a dot at a position which is shifted from another dot by a distance smaller than the feed pitch.

6. A dot matrix printing system of claim 1, wherein the control means determines the desired feed amount and the desired correspondence between the arrangements of the printing elements and of the printing pattern in the feed direction so that a new dot line is produced between already printed two successive dot lines.

7. A dot matrix printing system of claim 1, wherein the pattern generating means generates the printing pattern data indicative of a pattern having a size larger than the number of the printing elements, and wherein the control means determines the desired feed amount and the desired correspondence between the arrangements of the printing elements and of the printing pattern data in the feed direction so as to continuously print the printing pattern.

8. A dot matrix printing system of claim 1, wherein the print head includes an ink jet print head having a plurality of nozzles for ejecting inks.

9. A dot matrix printing system of claim 1, wherein the pattern generating means includes:

storage means for temporarily storing the generated printing pattern data; and pattern reading means for reading successive sets of printing pattern data, each set being constructed from a plurality of dot data arranged in the feed direction, the pattern reading means reading the successive sets of printing pattern data synchronously with the conveyance of the one of the print head and the printing medium in the line printing direction, wherein the correspondence changing means changes the correspondence between the printing elements and the read out printing pattern data.

10. A dot matrix printing system of claim 1, wherein the correspondence change means includes write means for receiving the generated printing pattern data from the pattern generating means and for writing the printing pattern data into a storage area, the write means being capable of changing a position, in the storage area, of the printing pattern data in the feed direction when writing the printing pattern data into the storage area, wherein the control means controls, based on a position desired to be printed with the printing pattern data, the write means to change a position to which the write means writes the printing pattern data, and wherein the print head reads out the printing pattern data from the storage area while maintaining the position of the printing pattern data and drives the printing elements in accordance with the printing pattern data.

11. A dot matrix printing system of claim 1, wherein the print head includes print head driving means for driving the printing elements in accordance with the printing pattern data supplied from the correspondence change means.

12. A dot matrix printing system for printing dots, the system comprising:

a print head having a plurality of printing elements arranged with a predetermined pitch in a direction substantially perpendicular to a line printing direction;

conveying means for conveying, in the line printing direction, one of the print head and a printing medium relative to the other one of the print head and the printing medium;

feed means capable of feeding, at a feed pitch different from the predetermined pitch, one of the print head and the printing medium relative to the other one of the print head and the printing medium in a feed direction which is perpendicular to the line printing direction;

storage means capable of storing a printing pattern data desired to be printed by the printing elements;

write means capable of writing the printing pattern data into the storage means while changing a position of the printing pattern data in the feed direction;

pattern reading means for successively reading the printing pattern data from the storage means in accordance with the conveyance of the one of the print head and the printing medium in the line printing direction; and control means for, based on a position desired to be printed with the printing pattern data, controlling a feed amount desired to be attained by the feed means and controlling the write means to change a position to which the write means writes the printing pattern data.

13. A printing system for printing dots, the system comprising:

a printing apparatus for printing dots, the printing apparatus including:

a print head having a plurality of printing elements arranged at a predetermined pitch in a direction substantially perpendicular to a line printing direction;

conveying means for conveying, in the line printing direction, one of the print head and a printing medium relative to the other one of the print head and the printing medium; and feed means capable of feeding, at a feed pitch different from the predetermined pitch, one of the print head and the printing medium relative to the other one of the print head and the printing medium in a feed direction which is perpendicular to the line printing direction; and a data generating apparatus for generating printing pattern data desired to be printed by the printing apparatus, the data generating apparatus including:

pattern generating means for generating a printing pattern data desired to be printed by the printing elements;

correspondence change means for changing a correspondence between arrangements of the printing pattern data in the feed direction and of the printing elements; and control means for, based on a position desired to be printed with a dot, controlling a feed amount desired to be attained by the feed means and controlling the correspondence change means to change the correspondence into a desired correspondence between the arrangement of the printing pattern data in the feed direction and of the printing elements.

14. A printing system of claim 13, wherein the correspondence change means includes:

storage means for temporarily storing the generated printing pattern data;

pattern reading means for successively reading the printing pattern data synchronously with the conveyance of the one of the print head and the printing medium in the line printing direction; and correspondence changing means for changing the correspondence between the arrangements of the printing elements and of the read out printing pattern data in the feed direction.

15. A printing system of claim 13, wherein the correspondence change means includes write means for receiving the generated printing pattern data from the pattern generating means and for writing the printing pattern data into a storage area, the write means being capable of changing a position of the printing pattern data in the feed direction when writing the printing pattern data into the storage area, wherein the control means controls, based on a position desired to be printed with the printing pattern data, the write means to change a position to which the write means writes the printing pattern data, and wherein the print head reads out the printing pattern data from the storage area while maintaining the position of the printing pattern data and drives the printing elements in accordance with the printing pattern data.

16. A printing system of claim 13, wherein the print head includes print head driving means for driving the printing elements in accordance with the printing pattern data supplied from the correspondence change means.

17. A printing system for printing dots, the system comprising:

a printing apparatus for printing dots, the printing apparatus including:

a print head having a plurality of printing elements arranged with a predetermined pitch in a direction substantially perpendicular to a line printing direction;

conveying means for conveying, in the line printing direction, one of the print head and a printing medium relative to the other one of the print head and the printing medium; and feed means capable of feeding, at a feed pitch different from the predetermined pitch, one of the print head and the printing medium relative to the other one of the print head and the printing medium in a feed direction which is perpendicular to the line printing direction; and a data generating apparatus for generating a printing pattern data desired to be printed by the printing elements, the data generating apparatus including:

storage means for storing the desired printing pattern data; and a printer driver for outputting the printing pattern data to the printing apparatus, the printer driver including:

pattern reading means for successively reading the printing pattern data from the storage means in accordance with the conveyance of the one of the print head and the printing medium;

correspondence change means for changing correspondence between the arrangement of the read out printing pattern data in the feed direction and the arrangement of the printing elements; and control means for, based on a position desired to be printed with the printing pattern data, controlling a feed amount desired to be attained by the feed means and controlling the correspondence change means to change the correspondence into a desired correspondence.

* * * * *